United States Patent [19]

Shrefler

[11] Patent Number: 4,478,169

[45] Date of Patent: Oct. 23, 1984

[54] MARKING DEVICE FOR FIRE HYDRANT OR THE LIKE

[76] Inventor: Kenneth D. Shrefler, 967 Lander Rd., Mayfield Village, Ohio 44143

[21] Appl. No.: 503,568

[22] Filed: Jun. 13, 1983

[51] Int. Cl.³ ........................ G09F 17/00; F16M 13/02

[52] U.S. Cl. .................................... 116/209; 116/173; 248/514

[58] Field of Search ................................ 116/173–175, 116/209; 248/293, 514; 403/93, 94, 96, 99, 101, 102

[56] References Cited

U.S. PATENT DOCUMENTS

| | | | |
|---|---|---|---|
| 952,045 | 3/1910 | Moore | 116/173 |
| 1,059,884 | 4/1913 | Link | 403/116 |
| 1,606,936 | 11/1926 | Hapgood | 116/320 |
| 3,044,435 | 7/1962 | Reardon | 116/173 |
| 3,141,253 | 7/1964 | Bartram | 116/173 |
| 3,495,568 | 2/1970 | Palinkos | 116/173 |

FOREIGN PATENT DOCUMENTS

| | | | |
|---|---|---|---|
| 599210 | 7/1945 | United Kingdom | 403/99 |

*Primary Examiner*—Charles Frankfort
*Assistant Examiner*—W. Morris Worth
*Attorney, Agent, or Firm*—Baldwin, Egan, Walling & Fetzer

[57] ABSTRACT

A marking device for aiding in locating a fire hydrant or the like, in the event that it is covered by snow, or underbrush, or some similar concealing environment. The marking device comprises a mounting bracket adapted for attachment to the fire hydrant and an elongated stem projecting upwardly from the mounting bracket so as to extend for a predetermined height above the hydrant to which it is attached. The stem preferably has a flag mounted thereon for enhancing the visibility of the marking device. The mounting device and the stem are so constructed and arranged that the stem can be swung from its generally upright position to a downwardly angled position, and thus out of any interfering relationship with the conventional operating nut on the hydrant.

9 Claims, 7 Drawing Figures

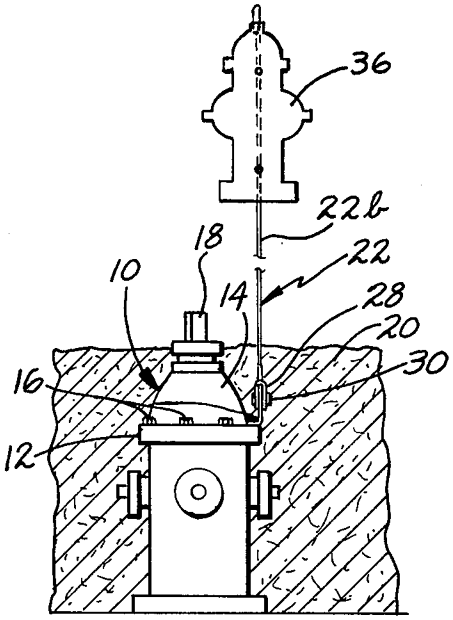
Fig 1
Fig 2
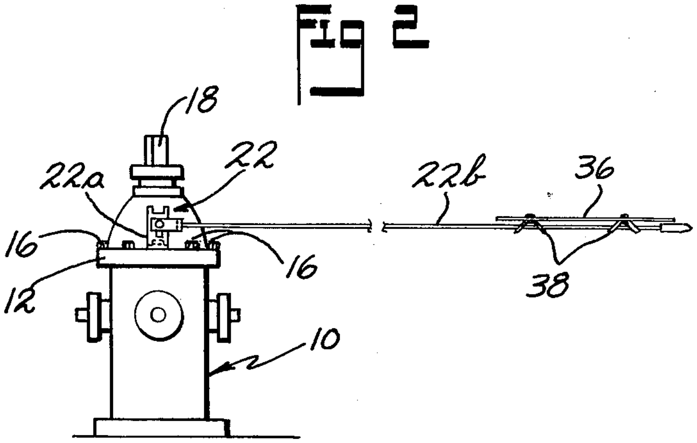
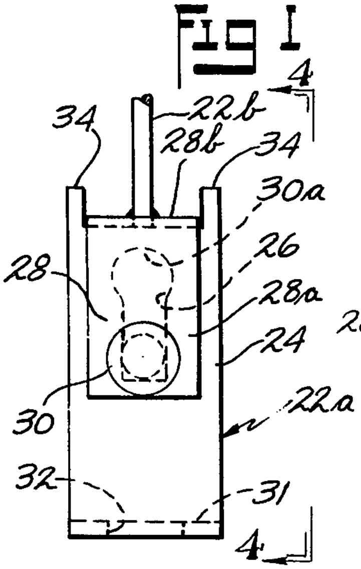
Fig 3
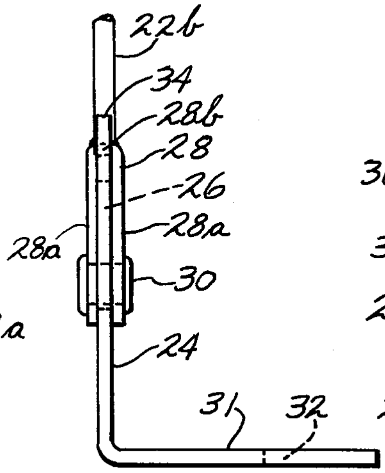
Fig 4
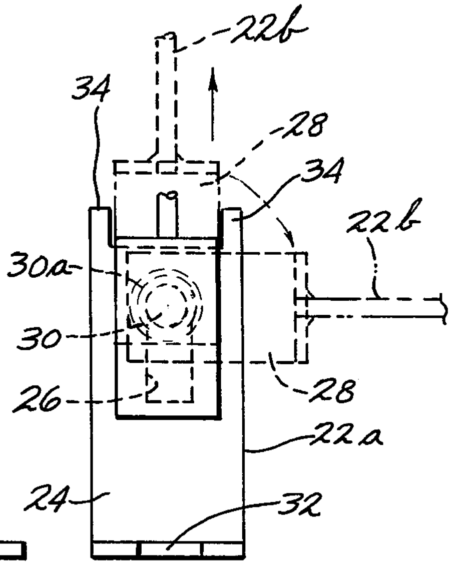
Fig 5
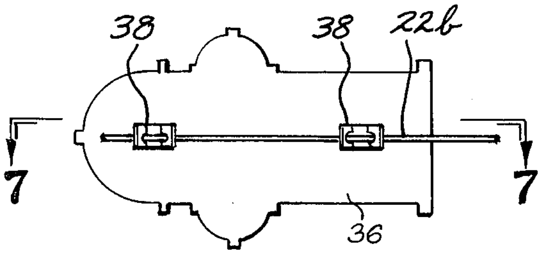
Fig 6
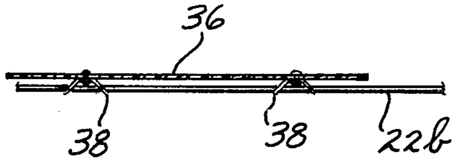
Fig 7

MARKING DEVICE FOR FIRE HYDRANT OR THE LIKE

This invention relates in general to marking devices for aiding in locating objects that may be concealed, and more particularly relates to a marking or locating device which is adapted for convenient attachment to a fire hydrant or the like, and which is operative to indicate the location of such hydrant in the event that it is hidden by a layer of snow, or underbrush, or other concealing media.

BACKGROUND OF THE INVENTION

Water hydrants in the northern climates are many times covered by a layer of snow, and thus are not readily locatable in the event that they are needed for a fire emergency or like happening, or they may be concealed in whole or in part by underbrush. The present invention provides a marking device adapted for ready attachment to a hydrant which will enable rapid location of the hydrant in the event that it is partially or completely concealed by snow, undergrowth or the like, and a device which can be collapsed or swung downwardly from its upright indicating position so that it will not present interference to the operation of the conventional operating nut on the hydrant. To applicant's knowledge there are no devices available of this nature for this purpose.

SUMMARY OF THE INVENTION

Accordingly, the present invention provides a novel marking or locating device for a fire hydrant or the like and which can be readily moved from an upright indicating position to another position. The marking device in the embodiment illustrated includes a bracket for mounting the device on the hydrant and coupling it thereto, and an elongated stem connected to the mounting bracket and projecting a predetermined substantial distance upwardly from the bracket, and including an arrangement for pivoting of the stem relative to the mounting bracket whereby the stem portion thereof can be swung from an upwardly extending indicating position to a lowered position, out of interfering relationship with the conventional operating nut of the fire hydrant.

Accordingly, an object of the invention is to provide a novel marking device for indicating the location of a fire hydrant or the like, which has been concealed by snow or underbrush, or some other concealing media.

A further object of the invention is to provide a novel marking device for a fire hydrant or the like which comprises a mounting means for mounting the marking device on the hydrant, an elongated stem connected to the mounting means and projecting a predetermined distance upwardly therefrom, and means providing for pivoting of the stem relative to the mounting means whereby the stem can be swung from its upwardly extending indicating position to a lowered position.

A still further object of the invention is to provide a marking device of the aforediscussed type which can be color coded for use by a municipality in aiding in classifying the hydrant system within its jurisdiction.

A still further object of the invention is to provide a novel marking device for use for indicating the location of a fire hydrant or the like which may be partially or completely concealed or buried, and which device is durable in construction and economical to utilize for marking the location of the hydrants.

Other objects and advantages of the invention will be apparent from the following description taken in conjunction with the accompanying drawings wherein:

BRIEF DESCRIPTION OF THE DRAWINGS

FIG. 1 is a diagrammatic, broken, elevational view of the marking device of the invention as attached to a fire hydrant which has been buried by a layer of snow;

FIG. 2 is a view similar to FIG. 1 but with the marking device of the invention having been lowered from the upright indicating position of FIG. 1 to a lowered position so as to move the marking device out of interfering relationship with respect to the conventional operating nut on the fire hydrant;

FIG. 3 is an enlarged, fragmentary illustration of the mounting bracket portion of the marking device of the invention, showing the connection of the stem portion to the mounting portion;

FIG. 4 is a view taken generally along the plane of line 4—4 of FIG. 3, looking in the direction of the arrows;

FIG. 5 is a view similar to FIG. 3 except taken from the opposite side thereof, but illustrating the unlocking of the stem portion of the marking device from the upright indicating position illustrated in FIGS. 1 and 3, by upward movement of the stem portion relative to the mounting bracket portion and then pivoting the stem portion relative to the mounting bracket portion so as to lower the stem portion from the upright position to a downward position as illustrated in FIG. 2;

FIG. 6 is an enlarged, fragmentary illustration of the flag secured to the stem portion of the marking device, and illustrating the spring clip means that provide for adjustment of the position of the flag lengthwise along the stem portion; and FIG. 7 is a sectional view taken generally along the plane of line 7—7 of FIG. 6, looking in the direction of the arrows.

DESCRIPTION OF PREFERRED EMBODIMENT

Referring now again to the drawings, there is shown a fire hydrant 10 of generally conventional type which includes a body flange 12 connecting the bonnet 14 thereto by means of flange bolts 16. The hydrant has a conventional operating nut 18 at its upper end, which is usually a multi-faceted nut adapted to be turned by means of a wrench, so as to open the hydrant for water flow. The hydrant in FIG. 1 is illustrated as being concealed by a layer of snow 20, thus making it rather difficult to conventionally locate.

The marking device 22 of the invention comprises a mounting portion *22a*, a stem portion *22b* coupled to the mounting portion, and in its indicating position, adapted to extend upwardly from the mounting portion a predetermined extent, so as to indicate the location or position of the hydrant, even though the latter is concealed by snow, or underbrush, or the like.

The stem portion *22b* of the marking device is movably coupled to the mounting portion *22a* so that the stem portion can be moved from the generally upright indicating position shown for instance in FIG. 1 to another angular or lowered position, as shown for instance in FIG. 2, thus moving the marking device out of any interfering relation with the conventional operating nut 18 of the fire hydrant, which thus can be turned by means of a conventional wrench without the marking device presenting any interference.

In this connection, the mounting portion 22a as best shown in FIGS. 3, 4 and 5, is formed as a bracket from flat stock, having a generally upright leg 24 which has an elongated slot 26 formed therein, and the stem section 22b has a generally inverted U-shaped bracket 28 secured thereto at its lower end, with bracket 28 embracing or encompassing the generally planar upright leg 24 of the mounting portion 22a. A pin or rivet 30 extends between the arms of the U-shaped bracket portion 28 and extends through the aforementioned slot 26 in the mounting section 22a, thus positively coupling the stem portion 22b to the mounting portion 22a, but providing for relative movement therebetween.

The upper end of slot 26 is preferably enlarged as at 30a giving the slot a keyhole configuration as best seen in FIG. 3 and FIG. 5, and for a reason to be hereinafter set forth. The lower leg portion 31 of the L-shaped mounting bracket 22a has an opening 32 therein which is adapted to receive therethrough one of the aforementioned bonnet bolts 16 on the conventional fire hydrant, to secure the marking device to the fire hydrant. In its preferred form, opening 32 opens onto the distal end of the leg 31. Thus the mounting device can be readily connected to the conventional hydrant by merely loosening one of the bonnet bolts 16, and slipping the leg portion 31 of the mounting bracket 22a beneath the bolt and then retightening the bolt.

The upper end of leg portion 24 of mounting bracket 22a is preferably provided with a pair of spaced projections 34 which thus positively restrain the stem portion 22b of the marking device against rotation or pivoting with respect to the mounting bracket portion 22a, when the attached bracket 28 of stem portion 22b is disposed in its lowered position on the mounting bracket 22a as illustrated in FIGS. 3 and 4. In this connection and as can be seen in FIGS. 3 and 4, pin 30 extends between the arms 28a of the inverted U-shaped bracket 28 adjacent the lower or distal ends of the latter, and the slot 26 is of sufficient lengthwise extent that the connecting base section 28b of the bracket 28 engages or seats on the upper end of the upright arm 24 of the L-shaped mounting bracket 22a in nesting relation between the spaced shoulder projections 34 on arm 24.

However, when it is desired to move the stem portion 22b from its upright indicating position, the stem portion 22b and attached bracket 28 is pulled upwardly to for instance a raised position as illustrated in FIG. 5 where rotation of the stem portion 22b and associated bracket 28 about the axis of associated pivot pin 30 is possible since the upper end of bracket 28 is clear of the projections 34 on the arm 24 of mounting bracket 22a, so that the stem portion can then be pivoted or moved to its lowered position as shown for instance in FIGS. 2 and 5. In this connection, the enlarged portion 30a of the slot 26 in arm portion 24 facilitates the pivotal movement of the stem portion 22b relative to the mounting bracket portion 22a.

The stem portion 22b preferably includes a flag 36 which is secured to the stem portion 22b as by means of U-shaped spring sheet metal clips 38. Flag 36 enhances the visibility of the stem portion and thus the location of the hydrant if the latter is concealed or buried. Flag 36 may be readily formed of some weather-resistant material, such as for instance plastic sheet, and can be made in the configuration of a hydrant as shown. By grasping the U-shaped clips 38 and squeezing the arms toward one another the flag 36 may be moved lengthwise of the stem portion 22b to thus selectively vary the location of the flag 36 relative to the lengthwise extent of the stem portion. The flag can be color coded to conform to whatever system a municipality may wish to utilize for designating visually to an inspector the classification of the fire hydrant in that particular municipality. The flag and associated supporting stem may also have a reflectionized surface to enhance its visibility at night.

From the foregoing description and accompanying drawings it will be seen that the invention provides a novel marking device for indicating a fire hydrant or the like which may be in buried or concealed condition by either heavy snowfall or growth of underbrush, or other concealing media, and comprising means for readily mounting the device on the hydrant and elongated stem means connected to the mounting means and projecting upwardly therefrom and including means providing for moving the stem means relative to the mounting means so that the marking device can be lowered or moved out of interfering condition with respect to the hydrant operating nut so that the hydrant can be utilized in the conventional way for emergency situations, or during accomplishment of regular maintenance operations on the hydrant. The invention also provides a device of the aforedescribed type which includes a latching or restraining means for ordinarily ensuring that the stem means will stay in generally upright condition, but providing for rapid movement of the stem means to a lowered position, out of interfering relationship with respect to the operating nut of the hydrant.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. A marking device for a fire hydrant or the like comprising, means for mounting the device on the hydrant, elongated stem means connected to said mounting means and projecting a predetermined distance upwardly from said mounting means, and means providing for pivoting of said stem means relative to said mounting means whereby said stem means can be moved from an upwardly extending position to a lowered position and below the plane of the operating nut of the hydrant, and wherein said mounting means comprises a generally L-shape, in side elevation, bracket having means on the horizontal leg of the bracket for attaching the marking device to the hydrant, and said stem means on the lower end thereof has an inverted generally U-shaped, in side elevation, bracket secured thereto and encompassing a portion of the upwardly extending leg of said L-shaped bracket, said upwardly extending leg having an elongated vertically extending slot therein and said inverted U-shaped bracket having a pin extending transversely thereof through said slot, said U-shaped bracket, said slot and said pin comprising said pivoting means, said pin being disposed adjacent the lower ends of the arms of the U-shaped bracket, and said upwardly extending leg having a shoulder projection on each side thereof at the upper end thereof comprising restraining means, which in conjunction with said pin extending through said slot adjacent the lower end of said U-shaped bracket prevents pivotal movement of said stem means with respect to said mounting bracket in said upwardly extending position of said stem means and unless said inverted U-shaped bracket and attached stem is moved upwardly relative to said slot so as to clear said shoulder projections at the upper end of said upwardly extending leg whereupon said inverted U-shaped bracket and attached stem can then be pivoted relative to said mounting bracket to move said stem means angularly with respect to said mounting bracket and below the plane of the operating nut on a hydrant.

2. A device in accordance with claim 1 wherein said stem means is flexible and includes a flag coupled thereto, for enhancing the visibility of said stem means.

3. A device in accordance with claim 2 including means movably mounting said flag on said stem means for selectively changing the location of said flag relative to said stem means lengthwise thereof.

4. A device in accordance with claim 1 wherein said means movably mounting said flag on said stem means comprises a spring clip which upon predetermined deformation thereof releases the frictional coaction between the clip and the stem means, thus permitting lengthwise movement of the flag relative to the stem means.

5. A device in accordance with claim 4 wherein said clips are of U-shaped configuration in elevation, having openings through the projecting arm portions thereof through which said stem means extends, said clips being formed of spring sheet metal.

6. A device in accordance with claim 2 wherein said flag is formed of flexible plastic material.

7. A device in accordance with claim 1 wherein said means on said horizontal leg of said mounting means comprises an open ended slot opening onto the distal end of said horizontal leg whereby said device can be conveniently assembled to a hydrant by loosening a hydrant fastener and slipping said horizontal leg beneath the hydrant fastener with the fastener extending through said open ended slot.

8. A device in accordance with claim 1 wherein the upper end of said slot in said upwardly extending leg of said mounting bracket is enlarged with respect to the remainder of the slot so as to facilitate the pivotal movement of said inverted U-shaped bracket and attached stem with respect to said mounting bracket in the raised position of said inverted U-shaped bracket, and wherein said slot is of sufficient elongated dimension that the upper end of said inverted U-shaped bracket engages the upper end of said upwardly extending leg of said mounting bracket and in nested relation between said shoulder projections in said upwardly extending position of said stem means on said mounting means, said pin being of such crosswise dimension that it has a generally slip-fit relation with said slot, and being disposed in a vertical plane generally equal distant from said shoulder projections and generally coplanar with said stem.

9. A marking device for a fire hydrant or the like comprising, means for mounting the device on the hydrant, elongated stem means connected to said mounting means and projecting a predetermined distance upwardly from said mounting means, and means providing for pivoting of said stem means relative to said mounting means whereby said stem means can be swung from an upwardly extending position to a substantially horizontally extending rest position relative to said mounting means, said stem means being formed of flexible material such as flexible metal rod, said mounting means comprising an L-shape in side elevation bracket formed of flat stock and having an open ended slot in the lower leg thereof, opening onto the distal end of said lower leg, for receiving a fastener on said hydrant, for securing the marking device to the hydrant, the upper leg of said mounting bracket having a generally vertical lengthwise extending elongated slot therein ending generally adjacent the upper end of said upper leg, said upper leg slot being of generally key-hole shaped configuration, said stem means having an inverted U-shaped, in side elevation, bracket secured to the lower end of the stem thereof and receiving between the arms thereof the upper end of said upper leg of said mounting bracket, a pin extending transversely through said inverted U-shaped bracket and through said key-hole slot in said upper leg of said mounting bracket, and connecting said stem means to said mounting bracket, said inverted U-shaped bracket, said key-hole slot and said pin comprising said pivoting means, said upper leg having a pair of spaced abutments extending upwardly therefrom with said inverted U-shaped bracket being received between said abutments when said inverted U-shaped bracket is in operative position on said mounting bracket with the attached stem projecting upwardly therefrom, said pin in said operative position of said U-shaped bracket being disposed generally adjacent the lower end of said inverted U-shaped bracket and said key-hole slot being of sufficient length that the upper end of said U-shaped bracket engages the upper end of said upper leg in nested relation between said abutments, said pin being of such crosswise dimension that it has a generally slip-fit relation with said key-hole slot in said operative position, said abutments in conjunction with said pin extending through said key-hole slot and disposed adjacent the lower end of said inverted U-shaped bracket, providing for restraining said stem means in said upwardly extending position, said key-hole slot in said upper leg being of sufficient length that the inverted U-shaped bracket and attached stem can be moved upwardly relative to said mounting bracket to a position wherein the upper end of said inverted U-shaped bracket clears said abutments sufficiently to permit pivoting of said U-shaped bracket and attached stem relative to said mounting bracket, whereby said stem means can be moved from said upwardly extending position to said generally horizontal rest position, thereby providing for movement of the marking device away from interfering relation with the conventional operating nut on a hydrant, said pin in said upwardly extending position of said stem means being disposed in a vertical plane generally equal distant from said abutments and generally coplanar with a vertical plane passing through said stem, the enlarged upper end of said key-hole slot facilitating pivotal movement of said inverted U-shaped bracket and attached stem with respect to said mounting bracket in an upwardly moved position of said inverted U-shaped bracket.

* * * * *